US011221767B2

(12) United States Patent
Calciu et al.

(10) Patent No.: US 11,221,767 B2
(45) Date of Patent: Jan. 11, 2022

(54) CACHE LINE PERSISTENCE INDICATOR FOR NON-VOLATILE MEMORY USING COHERENCE STATES

(71) Applicant: VMware, Inc., Palo Alto, CA (US)

(72) Inventors: Irina Calciu, Palo Alto, CA (US); Aasheesh Kolli, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 67 days.

(21) Appl. No.: 15/785,214

(22) Filed: Oct. 16, 2017

(65) Prior Publication Data

US 2019/0114092 A1 Apr. 18, 2019

(51) Int. Cl.
*G06F 3/06* (2006.01)
*G06F 12/128* (2016.01)
*G06F 12/0871* (2016.01)
*G06F 12/0811* (2016.01)

(52) U.S. Cl.
CPC .......... *G06F 3/0619* (2013.01); *G06F 3/0655* (2013.01); *G06F 3/0679* (2013.01); *G06F 12/0811* (2013.01); *G06F 12/0871* (2013.01); *G06F 12/128* (2013.01); *G06F 2212/283* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 6,018,763 | A * | 1/2000 | Hughes | G06F 12/0822 703/24 |
| 6,981,106 | B1 * | 12/2005 | Bauman | G06F 12/0822 711/146 |
| 10,049,050 | B2 * | 8/2018 | Blinick | G06F 12/0802 |
| 2004/0158681 | A1 * | 8/2004 | Hooker | G06F 9/3004 711/143 |
| 2006/0026594 | A1 * | 2/2006 | Yoshida | G06F 9/3824 718/100 |
| 2011/0320738 | A1 * | 12/2011 | Blake | G06F 12/0831 711/141 |
| 2012/0079211 | A1 * | 3/2012 | Laycock | G06F 12/0833 711/143 |

(Continued)

OTHER PUBLICATIONS

Chidambaram et al., "Optimistic Crash Consistency," SOSP'13, Nov. 3-6, 2013, Farmington, PA, 2 pages.

*Primary Examiner* — Charles Rones
*Assistant Examiner* — Ryan Dare
(74) *Attorney, Agent, or Firm* — Patterson + Sheridan, LLP (57) ABSTRACT

The disclosure provides an approach for testing if a cache line of a cache has been flushed to non-volatile memory (NVM). The approach generally includes reading, by a central processing unit (CPU), data from the NVM. The approach further includes storing, by the CPU, a copy of the data in the cache as a cache line. The approach further includes modifying, by the CPU, at least a portion of the copy of the data in the cache. The approach further includes requesting, by the CPU, the cache line be flushed to the NVM. The approach further includes performing, by the CPU, one or more instructions in parallel to the cache line being flushed to the NVM. The approach further includes requesting, by the CPU, a state of the cache line and determining if the cache line has been persisted in the NVM based on the state of the cache line.

20 Claims, 2 Drawing Sheets

(56) References Cited

U.S. PATENT DOCUMENTS

| | | | |
|---|---|---|---|
| 2015/0026443 A1* | 1/2015 | Kumar | G06F 9/30189 |
| | | | 712/234 |
| 2017/0052890 A1* | 2/2017 | Chen | G06F 12/084 |
| 2017/0168826 A1* | 6/2017 | Ayub | G06F 9/30043 |
| 2017/0168931 A1* | 6/2017 | Kim | G06F 12/0895 |
| 2018/0181491 A1* | 6/2018 | DeLaurier | G06F 12/0891 |
| 2018/0300251 A1* | 10/2018 | Appu | G06F 12/0888 |

* cited by examiner

CACHE LINE PERSISTENCE INDICATOR FOR NON-VOLATILE MEMORY USING COHERENCE STATES

BACKGROUND

Computer software is often used to create systems that need to remain in "consistent" states. For example, computer software may implement a banking system that is composed of bank accounts. When a money transfer occurs from one bank account to another, the total amount of funds in the two accounts must remain equal before and after the transfer. Otherwise, something went wrong during the transfer and the banking system becomes inconsistent. In regards to a money transfer, the banking system would be considered consistent before the transfer is initiated or after the transfer successfully completes, and not during intermediate steps during the transfer process. That is, all steps of the money transfer—first debiting from the source account and second crediting to the destination account—must be completed, or none of the steps must be completed, for the banking system to remain in a consistent state.

A system is considered "consistent" if it maintains a predefined variant property for that system, as pertaining to a transaction. For a money transfer in a banking system, the variant property is that the total funds of source and destination accounts remain the same before and after the money transfer. One cause that may lead a system to be in an inconsistent, intermediate state is a power failure in the course of a transaction.

A sequence of steps that must all occur or none occur is referred in the art a "transaction," because similarly to a banking transaction, these steps have consistent initial and final steps, but inconsistent intermediate steps. A sequence of steps that must all occur or none occur is also referred in the art as a sequence of steps that must occur "atomically." Thus, the terms "atomic" and "transaction" are herein used to indicate the same concepts and will be used synonymously within the present disclosure.

Recently, devices that use non-volatile memory (NVM) have begun to see increased usage. Memory is where programs and data are kept when the processor is actively using them. Volatile or non-persistent memory is memory that needs constant power in order to prevent data from being erased. Volatile memory describes conventional memory, such as dynamic random access memory (DRAM). NVM is memory that is persistent (non-volatile). Non-volatile memory is memory that retains its data after having power cycled (turned off and then back on).

NVM presents new challenges in maintaining consistency of systems when transactions are interrupted, such as by power failures. One challenge is that the system may have been stored in NVM in an inconsistent state at the time of power loss, and when the power returns, the system is unable to continue from the precise point it left off. A second challenge is that caches used along with NVM are usually volatile. Changes to data within a cache need to be flushed to NVM for them to be recorded within memory. To flush data from a cache to memory means to copy contents of cache lines containing that data into memory, and then to evict those cache lines from the cache. Power loss may occur after changes were made but before some changes were flushed, resulting in a loss of data. The loss of data may leave the system in an inconsistent state.

DETAILED DESCRIPTION

Figure 1:
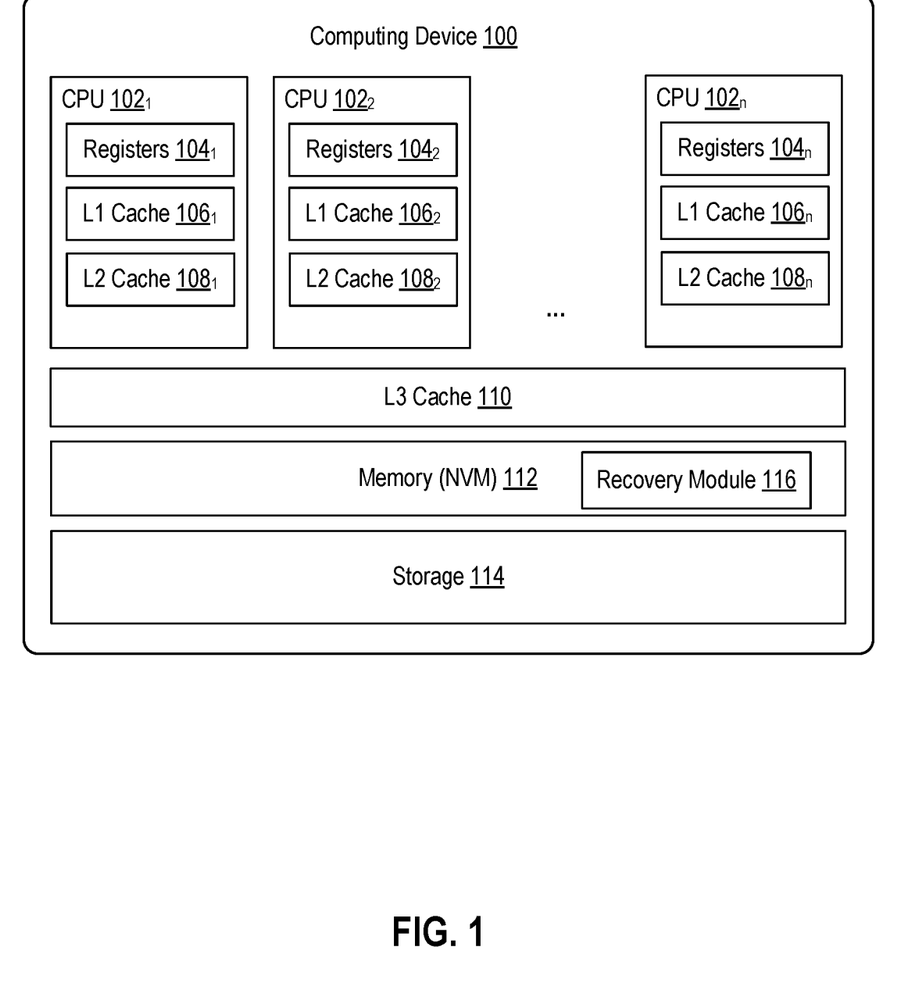
FIG. 1 is a block diagram of a computing device in which one or more embodiments of the present disclosure may be utilized.

FIG. 1 is a block diagram of a computing device 100 in which one or more embodiments of the present disclosure may be utilized. Computing device 100 includes one or more central processing units (CPUs) $102_1$ to $102_n$ (collectively referred to as CPUs 102 or individually referred to as CPU 102). A CPU 102 may include one or more processing cores. Though certain aspects are discussed herein with respect to a CPU 102, it should be noted that such aspects may refer to multiple cores or a single core of the CPU 102. Each CPU 102 is configured to execute instructions, for example, executable instructions that perform one or more operations described herein and may be stored in non-volatile memory 112 and/or in storage 114.

CPU 102 includes processor registers 104. A processor register is a quickly accessible location available to a CPU, consisting of a small amount of fast storage. A register is usually large enough to hold an instruction. For example, in a 64-bit computer, a register may be 64 bits in length. Registers 104 are private to their respective CPU 102 and are not accessible to other CPUs. For example, registers $104_1$ are accessible to CPU $102_1$, but not accessible to CPUs $102_2$-$102_n$.

CPU 102 includes one or more caches, 106, 108. As depicted in FIG. 1, CPU 102 contains two caches, L1 cache 106 and L2 cache 108. However, CPU 102 may only contain a single cache, or may contain more than two caches, depending on the design of CPU 102. Caches L1 and L2 are private to their respective CPU 102 and are not accessible to other CPUs. For example, L1 cache $106_1$ and L2 cache $108_1$ are accessible to CPU $102_1$, but not accessible to CPUs $102_2$-$102_n$. L1 cache 106 is typically smaller in size than L2 cache 108.

Computing device 100 includes a shared cache, L3 cache 110. L3 cache 110 is accessible to all CPUs $102_1$ to $102_n$. L3 cache 110 is typically larger in size than L2 cache 108. As in known in the art, the "L" in L1, L2, L3 stands for "level." FIG. 1 illustrates a cache hierarchy in that L1 cache 106 is a cache of L2 cache 108, which is a cache of L3 cache 110. FIG. 1 further illustrates a storage-memory-cache hierarchy in that L3 cache 110 is a cache of memory 112, and memory 112 is a cache of storage 114.

Computing device 100 also includes memory 112. As described herein memory 112 is non-volatile memory and is herein also referred to as non-volatile memory (NVM) 112. NVM 112 is memory that is persistent and retains its data after having power cycled (turned off and then back on). Although computing device 100 is not shown to include volatile memory, it is contemplated that computing device 100 may include volatile memory (not shown) in addition to NVM 112. As known in the art, data is brought from NVM 112 into caches, 106, 108, 110, by bringing a copy of a cache line containing that data from NVM 112 into the target cache, 106, 108, and/or 110. For example, data may be transferred between NVM 112 and cache, 106, 108, and/or 110 in blocks of a fixed size called cache lines. When bringing in data from memory into a cache, a cache entry is created which includes a copy of the data as well as information regarding the memory location in NVM 112 of the data in the form of a cache line.

Computing device 100 includes storage 114. Storage 114 represents local persistent storage devices (e.g., one or more hard disks, flash memory modules, solid state disks, and optical disks). Storage 114 is typically slower than NVM 112 and is typically larger in size than NVM 112. As known in the art, data from storage 114 is brought into NVM 112 by paging memory pages from storage 114 into NVM 112.

NVM 112 includes recovery module 116. Recovery module 116 is a software program that executes after computing device 100 is shut down improperly, such as after a power failure. Recovery module 116 may be executed on one or more of the CPUs 102. In certain embodiments, recovery module 116 may instead be stored in storage 114.

The following is an example of how data stored in NVM 112 can be modified using a traditional cacheable store including L1 cache 106 (e.g., as well as L2 cache 108 and L3 cache 110). For example, a variable X may be stored in NVM 112. Code may be executed by CPU 102 to modify the value of X, such as an instruction of X=5. In order to modify X, the cache line in which the current value of X is stored in NVM 112 may be brought into L1 cache 106 (e.g., as well as L2 cache 108 and L3 cache 110). The value of X may then be modified in place in the L1 cache 106. However, the value of X may not be persistent in this state as it may only be modified in one or more of L1 cache 106, L2 cache 108, and L3 cache 110 and not yet persisted and stored in NVM 112. In order to ensure that the value of X is persisted and stored in NVM 112, the following pseudo code may be executed by CPU 102:

```
X=5;
Flush X;
SFENCE;
```

A "flush" instruction (e.g., operation) may ensure that the contents of a cache are stored in NVM 112 and evicted from the cache. A flush instruction, in certain examples, may correspond to one of a CLFLUSH, CLFLUSHOPT, or CLWB instruction as provided by the x86 instruction set architecture (ISA). Some flush instructions may have weak ordering, meaning the order in which instructions in code are performed may not be guaranteed. Accordingly, an ordering instruction (e.g., SFENCE) may be used to ensure proper ordering. In particular, any instructions before the ordering instruction may be performed before any additional instructions after the ordering instruction are performed.

For example, to ensure that a variable X is modified and persisted to NVM 112 before another variable Y is modified, the following pseudo code may be executed by CPU 102:

```
X=5;
Flush X;
SFENCE;
Y=10;
```

In certain cases, as discussed, atomicity of instructions may be necessary, such as in the banking transaction example. To guarantee such atomicity of instructions, the code for executing such instructions may need to be explicitly identified as failure-atomic sections, such as using a predefined application programming interface (API). For example, to ensure that both a variable A and B stored in NVM 112 are modified and persisted to NVM 112 or neither is modified in NVM 112, the following pseudo code may be executed by CPU 102:

```
FAILURE-ATOMIC-SECTION-START( );
A=A-100;
B=B+100;
FAILURE-ATOMIC-SECTION-END( );
```

Any instructions between the FAILURE-ATOMIC-SECTION-START( ) and FAILURE-ATOMIC-SECTION-END( ) instructions may be guaranteed to be performed atomically.

In certain aspects, atomicity of instructions may be guaranteed using mechanisms such as redo logs and undo logs. A log may be a data structure stored in NVM 112 and/or storage 114 that is persistent. The log may include entries that indicate an address in memory (e.g., NVM 112) and a value associated with the address (e.g., as an entry <address, value>). The log may be stored separately from the actual value stored at the actual address in memory.

Redo logs allow a system to log (or record) the new value of a variable in a log without changing the value of the variable itself at the address in NVM 112. Once all the variables within a transaction have been logged (their new values recorded in the log), the system may proceed to change the value of the actual variables at the addresses they are stored within NVM 112. If a power failure occurs while variables are being logged, then the system simply remains at its original, unchanged consistent state. If power failure occurs after the variables have been logged, then the system has the option to "redo" the variable assignments by accessing the log and assigning new values to variables at the addresses they are stored within NVM 112, which would bring the system to a resulting consistent state. In both situations, the system would remain in a consistent state— either pre-assignment or post assignment consistent states.

For example, to ensure that both a variable A and B are modified atomically in NVM 112, the following pseudo code may be executed by CPU 102:

```
FAILURE-ATOMIC-SECTION-START( );
Insert Entry1 = <Address(A), New-Value(A)> into redo log;
Flush Entry1 from caches;
Insert Entry2 = <Address(B), New-Value(B)> into redo log;
Flush Entry2 from caches;
SFENCE;
Insert Entry3 = COMMIT into redo log;
Flush Entry3;
SFENCE;
A = A - 100;
B = B + 100;
FAILURE-ATOMIC-SECTION-END( );
```

The Insert Entry 1 instruction inserts the new value of the instruction A=A−100 into a redo log in a cache (e.g., L1 cache 106). The Flush Entry 1 instruction flushes the log entry for A to the log stored in NVM 112. The Insert Entry 2 instruction inserts the new value of the instruction B=B+100 into the redo log in the cache (e.g., L1 cache 106). The Flush Entry 2 instruction flushes the log entry for B to the log stored in NVM 112.

In case of a failure before the SFENCE instruction after the Flush Entry 2 instructions, the recovery module 116 may throw away the redo log, since it is guaranteed that none of the variables A and B have been modified at their actual address locations in NVM 112. However, if a failure happens after the SFENCE instruction, the recovery module 116 may not know if the variables A and B have been modified at their actual address locations in NVM 112. The recovery module 116, however, can update the values of the variables A and B at their actual address locations in NVM 112 using the new values saved in the redo log. However, the recovery module 116 may not be able to differentiate between whether the failure occurred before or after the SFENCE instruction. Accordingly, the Insert Entry 3 command inserts a COMMIT entry in the redo log indicating that all entries in the redo log have been inserted for the transaction. If there is a failure, and no COMMIT in the redo log, the recovery module 116 discards the redo log. If there is a failure, and a COMMIT in the redo log, the recovery module 116 updates the values of the variables A and B at their actual address locations in NVM 112 using the new values saved in the redo log.

Undo logs allow a system to log (or record) the old value of a variable in a log. Once all the variables within a transaction have been logged (their old values recorded in the log), the system may proceed to change the value of the actual variables at the addresses they are stored within NVM 112. If a power failure occurs while variables are being logged, then the system simply remains at its original, unchanged consistent state. If power failure occurs after the variables have been logged and some variables have been changed, then the system has the option to "undo" the variable assignments by accessing the log and assigning old values to variables at the addresses they are stored within NVM 112, which would bring the system back to the original, unchanged consistent state. In both situations, the system would remain in a consistent state—the pre-assignment consistent state.

For example, to ensure that both a variable A and B are modified atomically in NVM 112, the following pseudo code may be executed by CPU 102:

```
FAILURE-ATOMIC-SECTION-START( );
Insert Entry1 = <Address(A), Old-Value(A)> into undo log;
Flush Entry1 from caches;
SFENCE;
A=A−100;
Insert Entry2 = <Address(B), Old-Value(B)> into undo log;
Flush Entry2 from caches;
SFENCE;
B=B+100;
Insert Entry3 = COMMIT into undo log;
Flush Entry3;
SFENCE;
FAILURE-ATOMIC-SECTION-END( );
```

The Insert Entry 1 instruction inserts the current old value of A into an undo log in a cache (e.g., L1 cache 106). The Flush Entry 1 instruction flushes the log entry for A to the log stored in NVM 112. The value of A at its actual address location in NVM 112 is then modified. The Insert Entry 2 instruction inserts the current old value of B into an undo log in a cache (e.g., L1 cache 106). The Flush Entry 2 instruction flushes the log entry for B to the log stored in NVM 112. The value of B at its actual address location in NVM 112 is then modified. A COMMIT is then inserted into the undo log. If there is a failure before the commit is inserted in the undo log, the recovery module 116 updates the value(s) of the variables A and/or B at the actual address location(s) in NVM 112 using the old value(s) saved in the undo log. If there is a failure after the commit is inserted in the undo log, the transaction completed before the failure, so the undo log is discarded.

Undo logs need the old value to be inserted in the log before every store and this data needs to be guaranteed to be durable (flushed to NVM 112) before a variable stored in NVM 112 is modified. This means a flush and SFENCE are required every time a variable is changed. This is in contrast to redo logs, which can have just one SFENCE for both logs and flushes. Thus, writes are expensive (e.g., in terms of time/latency) when using undo logs.

For redo logs, reads may be expensive as the new values of variables are only written to the actual address locations in NVM 112 after being written to the redo log. Accordingly, if the new value of a variable needs to be read for an operation, the read may need to be redirected to the value stored in the redo log, which may increase latency and complexity of the code to code in the redirection.

As discussed, to persist a cache line from a cache (e.g., L1 cache 106, L2 cache 108, L3 cache 110, etc.) in a computing device 100 to NVM 112 in the computing device 100, a flush instruction is executed by a CPU 102 of the computing device 100. Such flush instructions may be used in many different scenarios such as those discussed. In order to ensure that the cache line is persisted and to avoid any error in operation of an application, if an application running on CPU 102 executes a flush instruction, conventionally a SFENCE instruction is also used to ensure that the application running on the CPU 102 is blocked or prevented from executing additional instructions until the flush instruction is completed and the data from the cache line is actually stored and persisted in NVM 112. Therefore, any additional instructions run on CPU 102 occur after the cache line is stored and persisted in NVM 112. Such a synchronous mechanism to request that a cache line is persisted where the application is blocked from executing additional instructions until the data is persisted in CPU 102 may cause CPU cycles of CPU 102 to go idle, or may slow down the operation of the application.

Accordingly, certain embodiments relate to techniques for checking to see if a cache line has been persisted. Using such techniques, a request to persist a cache line from a cache to NVM 112 can be performed without blocking an application from executing additional instructions while the cache line is being persisted to NVM 112 (e.g., without using a SFENCE instruction) while still avoiding errors in operation of the application. For example, the application can continue to execute instructions and do work while the cache line is still being flushed from the cache to NVM 112 in the background without errors in operation of the application. Further, certain embodiments relate to techniques for checking if the cache line has been persisted or not after running the flush instruction to ensure proper functioning of the system including the application running on CPU 102. In particular, the CPU 102 may check a status or state of the cache line and based on the state determine if the cache line has been persisted or not. The techniques discussed herein relating to checking if the cache line has been persisted based on a state of the cache line may be used in conjunction with other processes and techniques including those for ensuring consistency of data, such as those described herein (e.g., including redo and undo logs).

In certain embodiments, a cache line can be in a dirty state or a clean state. In the dirty state, the cache line stored in a cache (e.g., L1 cache 106, L2, cache 108, L3 cache 110, etc.) includes a copy of data in NVM 112 that has been modified in the cache and not yet copied back from the cache to NVM 112. In the clean state, the cache line stored in a cache includes a copy of data in NVM 112 that has not been modified and is the same value as the data stored in NVM 112. CPU 102 may query a state of a cache line to determine if the cache line is in a clean state or a dirty state. If the cache line is in the dirty state, the CPU 102 determines that the cache line has not been persisted from the cache to NVM 112. If the cache line is in the clean state, the CPU 102 determines that the cache line has been persisted from the cache to NVM 112.

Traditional computing devices may not provide the ability for a CPU to determine the state of a cache line. Accordingly, certain embodiments herein provide a hardware component or modification of the hardware of computing device 100 (e.g., modification of L1 cache 106, L2, cache 108, L3 cache 110, etc.) to allow CPU 102 to query the state of a cache line in a cache of computing device 100. In certain aspects, an additional instruction may be added to an instruction set architecture (ISA) (e.g., x86 ISA) of the computing device 100 that when executed by CPU 102 can take as input an identifier of a cache line (e.g., index, memory location in NVM 112 of data stored in the cache line, etc.) and return to the CPU 102 the state of the cache line.

In certain embodiments, a cache line may not simply be in one of a dirty state or a clean state. For example, the computing device 100 may adhere to a cache coherence protocol such as one of a MESI, MESIF, or MOESI cache coherence protocol. In the MESI protocol, the cache can be in one of a modified (M) state, exclusive (E) state, shared (S) state, or invalid (I) state. In the M state, the cache line is only present in the current cache (e.g., one of L1 cache 106, L2, cache 108, L3 cache 110, etc.) of the computing device 100 and not another cache of the computing device 100. Further, the data in the cache has been modified so that at least a portion of the data corresponding to the cache line in the cache has a different value than the corresponding data stored in NVM 112. The cache therefore may be required to write back the data of the cache line from the cache to NVM 112 before any reads can be performed from NVM 112 with respect to the data in the cache line.

In the E state, the cache line is only present in the current cache of the computing device 100 and is clean, meaning the data in the cache corresponding to the cache line has the same value as the corresponding data in NVM 112. In the S state, the cache line is present not only in the current cache of the computing device 100, but another cache as well and is clean, meaning the data in the cache corresponding to the cache line has the save value as the corresponding data in NVM 112. In the I state, the cache line is unused or invalid.

In the MESIF protocol, the M, E, S, and I states are the same as the MESI protocol. However, there is an additional forward (F) state. The F state is a special form of the S state that indicates the cache line is present not only in the current cache of the computing device 100, but another cache as well and is clean, meaning the data in the cache corresponding to the cache line has the sane value as the corresponding data in NVM 112. Further, in the F state, any request made for the cache line in computing device 100 is directed to the current cache with a the cache line in the F state, as opposed to another cache that includes the cache line (e.g., in an S state).

In the MOESI protocol, the M, E, S, and I states are the same as the MESI protocol. However, there is an additional owned (O) state. In the O state, the cache line is present not only in the current cache of the computing device 100, but another cache as well and may be clean or dirty. Further, in the O state, only the current cache with the cache line in the O state has the exclusive right to make changes to the cache line, as opposed to another cache that includes the cache line (e.g., in an S state). The cache with the cache line in the O state, accordingly, broadcasts any changes made to the cache line to other caches having a copy of the cache line to maintain data consistency.

In certain embodiments, the CPU 102 executes an instruction or query to determine the state of a cache line after executing a flush instruction with respect to the cache line. The CPU 102 may be returned a value indicating the cache line is in one of a M, E, S, I, F, or O state of a MESI, MESIF, or MOESI cache coherence protocol depending on the cache coherence protocol implemented at computing device 100. In certain embodiments, if the CPU 102 determines the cache line is in any one of an E, S, I, or F state, the CPU 102 determines the flush instruction has completed and the cache line has been flushed to NVM 112 and is persisted in NVM 112. For example, the cache line may be known to be clean in each of the E, S, I, and F states, and therefore flushed to NVM 112.

In certain embodiments, if the CPU 102 determines the cache line is in any one of a M or O state, the CPU 102 determines the flush instruction has not completed and the cache line has not been flushed to NVM 112 and is not persisted in NVM 112. It should be noted that just because the cache line is in the M or O state does not necessarily mean that modified data in the cache line has not been flushed and stored in NVM 112 pursuant to a flush instruction. For example, CPU 102 may modify a cache line and the cache line may be in the M state. The CPU 102 may then complete the flush of the modified cache line to NVM 112 pursuant to a flush instruction, meaning the cache line is clean. The CPU 102 may then further modify the cache line so it is again in the M state and dirty. Therefore, even though the modified data has already been flushed to NVM 112 pursuant to the flush instruction, the state of the cache line is still M due to further modification. This may lead to a false negative about a determination by CPU 102 about whether the data in the cache line has been persisted in NVM 112, but prevents false positives, thus ensuring no errors occur in operation of the system. The same holds true of the O state.

In certain embodiments, the determination of whether a cache line has been persisted or not needs to be performed by the same CPU 102 as that which modified the cache line.

Accordingly, embodiment herein present efficient techniques for determining whether or not data has been persisted from a cache line into NVM 112 based on querying the state of the cache line and without having to access NVM 112, which may improve performance.

Figure 2:
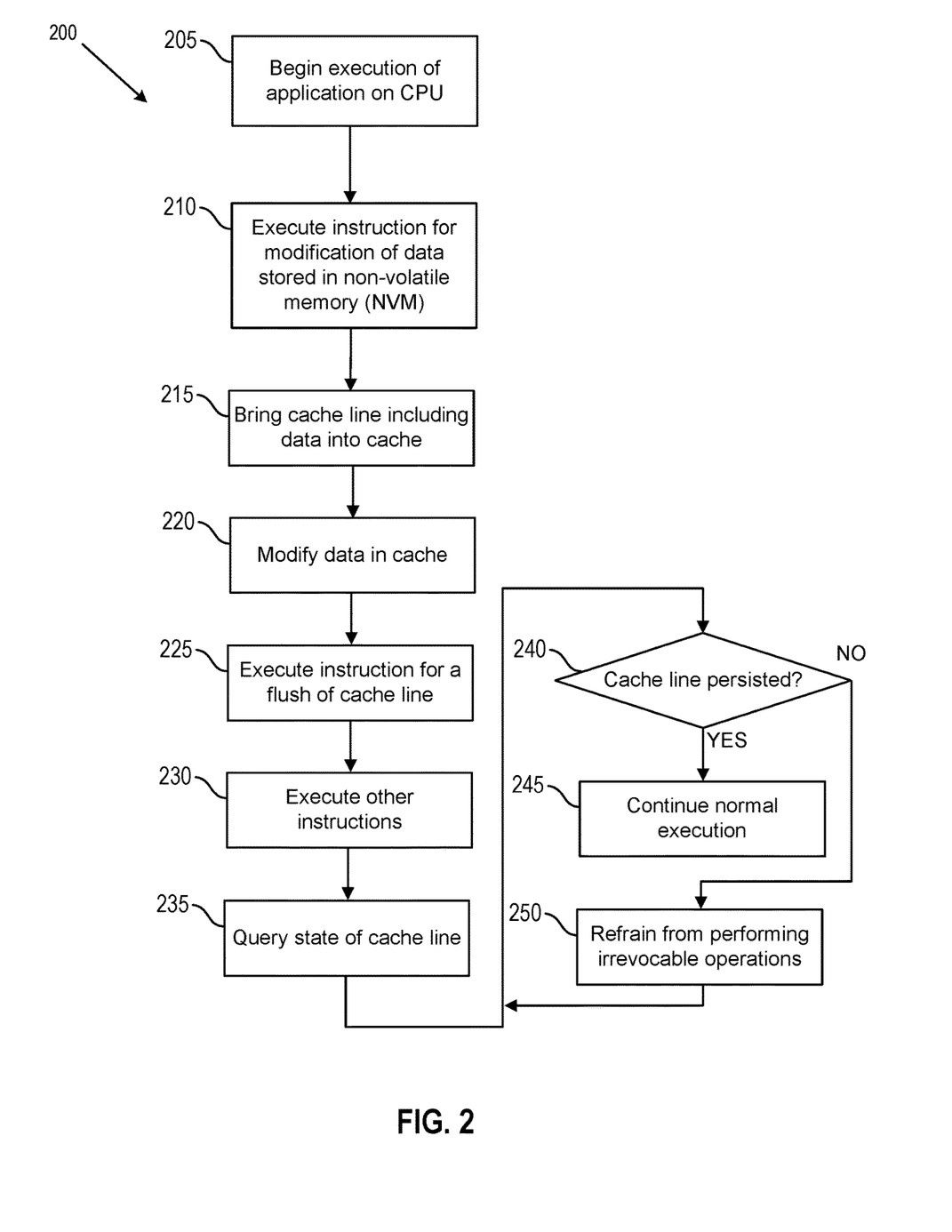
FIG. 2 is a flowchart illustrating example operations 200 for testing if a cache line of a cache has been flushed to non-volatile memory (NVM) pursuant to a flush instruction.

FIG. 2 is a flowchart illustrating example operations 200 for testing if a cache line of a cache has been flushed to non-volatile memory (NVM) pursuant to a flush instruction.

At block 205, an application begins executing on CPU 102. At block 210, the application executes an instruction on CPU 102 to modify data (e.g., a variable) stored in NVM 112.

At block 215, the data to be modified is copied from NVM 112 to at least one cache (e.g., L1 cache 106, L2, cache 108, L3 cache 110, etc.) accessible by CPU 102. At block 220, the data is modified in the copy in the cache, but not in NVM 112. At block 225, the application executes a flush instruction for the cache line.

At block 230, the application begins executing one or more additional instructions while the cache line is being flushed from the cache to NVM 112 in the background. For example, the one or more additional instructions are executed before completion of the flush of the cache line from the cache to NVM 112, but after execution of the flush instruction. At block 235, the CPU 102 queries the state of the cache line.

At block 240, the CPU 102 determines whether the cache line has been flushed and stored to NVM 112 so that the data in the cache line is persisted based on the state of the cache line. If at block 240, the CPU 102 determines that the cache line is persisted, then the CPU 102 continues to block 245 where normal execution of the application continues. For example, the application may perform irrevocable operations with respect to data in the cache line that require the cache line be persisted in order to ensure proper functioning of the application should there be a failure. Irrevocable operations may include I/O operations to storage devices or to a network, any as well as other operations that cannot be aborted. If at block 240, the CPU 102 determines that the cache line is not persisted, then the CPU 102 continues to block 250 where the CPU 102 refrains from performing irrevocable operations. For example, the application may not execute instructions for irrevocable operations to prevent any issues with the system should a failure occur. However, the application may execute other instructions or CPU 102 may perform other work in parallel with the cache line being flushed in the background. After block 250, the operations 200 return to block 240.

In certain embodiments, if the cache line has not been persisted, but the application requires the cache line to be persisted to perform additional operations or execute additional instructions, the application may wait until the cache line is persisted and keep checking, or force the cache line to be persisted immediately.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for testing if a cache line of a cache has been flushed to non-volatile memory (NVM) of a computing device, the method comprising:
   reading, by a central processing unit (CPU), data from the NVM;
   storing, by the CPU, a copy of the data in the cache as a cache line;
   modifying, by the CPU, at least a portion of the copy of the data in the cache;
   requesting, by the CPU, the cache line be flushed to the NVM;
   begin executing, by the CPU, one or more instructions in parallel to the cache line being flushed to the NVM and prior to completion of flush of the cache line;
   during executing the one or more instructions, requesting, by the CPU, a state of the cache line by executing, by the CPU, a request instruction that takes as input an identifier of the cache line and returns the state of the cache line; and
   determining, by the CPU, if the flush of the cache line has been completed and thus the cache line persisted in the NVM based on the state of the cache line.

2. The method of claim 1, wherein if the cache line is in a dirty state, the CPU determines the cache line has not been persisted, and wherein if the cache line is in a clean state, the CPU determines the cache line has been persisted.

3. The method of claim 1, wherein if the cache line is in one of an exclusive, shared, invalid, or forward state of a MESI, MESIF, or MOESI cache coherence protocol, the CPU determines the cache line has been persisted, and wherein if the cache line is in one of a modified or owned state of the MESI, MESIF, or MOESI cache coherence protocol, the CPU determines the cache line has not been persisted.

4. The method of claim 3, wherein the cache line is in one of the modified or owned state and the modified at least a portion of the copy of the data has been persisted to the NVM.

5. The method of claim 1, further comprising:
   if the CPU determines the cache line has been persisted, performing, by the CPU, one or more irrevocable operations; and
   if the CPU determines the cache line has not been persisted, refraining from performing, by the CPU, one or more irrevocable operations.

6. The method of claim 1, further comprising:
   if the CPU determines the cache line has not been persisted, determining if the CPU has any irrevocable operations to perform; and
   if the CPU determines there are irrevocable operations to perform, requesting, by the CPU, the cache line be immediately flushed to the NVM.

7. The method of claim 1, wherein the request instruction is based on an instruction set architecture (ISA) of the computing device.

8. A non-transitory computer-readable storage medium comprising instructions, which when executed by a computing system, causes the computing system to carry out a method for testing if a cache line of a cache has been flushed to non-volatile memory (NVM) of the computing system, the method comprising:
   reading, by a central processing unit (CPU), data from the NVM;
   storing, by the CPU, a copy of the data in the cache as a cache line;
   modifying, by the CPU, at least a portion of the copy of the data in the cache;
   requesting, by the CPU, the cache line be flushed to the NVM;
   begin executing, by the CPU, one or more instructions in parallel to the cache line being flushed to the NVM and prior to completion of flush of the cache line;
   during executing the one or more instructions, requesting, by the CPU, a state of the cache line by executing, by the CPU, a request instruction that takes as input an identifier of the cache line and returns the state of the cache line; and
   determining, by the CPU, if the flush of the cache line has been completed and thus the cache line persisted in the NVM based on the state of the cache line.

9. The non-transitory computer-readable storage medium of claim 8, wherein if the cache line is in a dirty state, the CPU determines the cache line has not been persisted, and wherein if the cache line is in a clean state, the CPU determines the cache line has been persisted.

10. The non-transitory computer-readable storage medium of claim 8, wherein if the cache line is in one of an exclusive, shared, invalid, or forward state of a MESI, MESIF, or MOESI cache coherence protocol, the CPU determines the cache line has been persisted, and wherein if the cache line is in one of a modified or owned state of the MESI, MESIF, or MOESI cache coherence protocol, the CPU determines the cache line has not been persisted.

11. The non-transitory computer-readable storage medium of claim 10, wherein the cache line is in one of the modified or owned state and the modified at least a portion of the copy of the data has been persisted to the NVM.

12. The non-transitory computer-readable storage medium of claim 8, wherein the method further comprises:
   if the CPU determines the cache line has been persisted, performing, by the CPU, one or more irrevocable operations; and
   if the CPU determines the cache line has not been persisted, refraining from performing, by the CPU, one or more irrevocable operations.

13. The non-transitory computer-readable storage medium of claim 8, wherein the method further comprises:
   if the CPU determines the cache line has not been persisted, determining if the CPU has any irrevocable operations to perform; and
   if the CPU determines there are irrevocable operations to perform, requesting, by the CPU, the cache line be immediately flushed to the NVM.

14. The non-transitory computer-readable storage medium of claim 8, wherein the request instruction is based on an instruction set architecture (ISA) of the computing device.

15. A computing system, comprising:
   a cache;
   a non-volatile memory; and
   a central processing unit (CPU) configured to:
   read data from the NVM;

store a copy of the data in the cache as a cache line;
modify at least a portion of the copy of the data in the cache;
request the cache line be flushed to the NVM;
being to execute one or more instructions in parallel to the cache line being flushed to the NVM and prior to completion of flush of the cache line;
during executing the one or more instructions, request a state of the cache line by executing a request instruction that takes as input an identifier of the cache line and returns the state of the cache line; and
determine if the flush of the cache line has been completed and thus the cache line persisted in the NVM based on the state of the cache line.

16. The computing system of claim 15, wherein if the cache line is in a dirty state, the CPU determines the cache line has not been persisted, and wherein if the cache line is in a clean state, the CPU determines the cache line has been persisted.

17. The computing system of claim 15, wherein if the cache line is in one of an exclusive, shared, invalid, or forward state of a MESI, MESIF, or MOESI cache coherence protocol, the CPU determines the cache line has been persisted, and wherein if the cache line is in one of a modified or owned state of the MESI, MESIF, or MOESI cache coherence protocol, the CPU determines the cache line has not been persisted.

18. The computing system of claim 17, wherein the cache line is in one of the modified or owned state and the modified at least a portion of the copy of the data has been persisted to the NVM.

19. The computing system of claim 15, wherein the CPU is further configured to:
if the CPU determines the cache line has been persisted, perform one or more irrevocable operations; and
if the CPU determines the cache line has not been persisted, refrain from performing one or more irrevocable operations.

20. The computing system of claim 15, wherein the CPU is further configured to:
if the CPU determines the cache line has not been persisted, determine if the CPU has any irrevocable operations to perform; and
if the CPU determines there are irrevocable operations to perform, request the cache line be immediately flushed to the NVM.

* * * * *